(12) United States Patent
Iizuka

(10) Patent No.: US 8,627,229 B2
(45) Date of Patent: Jan. 7, 2014

(54) INFORMATION DEVICE AND WINDOW DISPLAY METHOD

(75) Inventor: Mitsuhiro Iizuka, Osaka (JP)

(73) Assignee: Panasonic Corporation, Osaka (JP)

( * ) Notice: Subject to any disclaimer, the term of this patent is extended or adjusted under 35 U.S.C. 154(b) by 508 days.

(21) Appl. No.: 12/402,666

(22) Filed: Mar. 12, 2009

(65) Prior Publication Data

US 2009/0235203 A1    Sep. 17, 2009

(30) Foreign Application Priority Data

Mar. 13, 2008   (JP) ................................. 2008-063667

(51) Int. Cl.
*G06F 3/00*        (2006.01)

(52) U.S. Cl.
USPC ............ 715/800; 715/764; 715/781; 715/788

(58) Field of Classification Search
USPC ........... 345/418–475; 715/764, 781, 788, 800
See application file for complete search history.

(56) References Cited

U.S. PATENT DOCUMENTS

| | | | | |
|---|---|---|---|---|
| 5,577,187 A * | 11/1996 | Mariani | .................. | 715/792 |
| 5,714,971 A * | 2/1998 | Shalit et al. | ................. | 715/804 |
| 5,874,962 A * | 2/1999 | de Judicibus et al. | ........ | 715/789 |
| 6,573,913 B1 * | 6/2003 | Butler et al. | .................. | 715/761 |
| 6,639,606 B1 * | 10/2003 | Choi | .............................. | 715/700 |
| 6,683,627 B1 * | 1/2004 | Ullmann et al. | .............. | 715/786 |
| 7,590,947 B1 * | 9/2009 | Gay et al. | ...................... | 715/800 |
| 2003/0107604 A1 * | 6/2003 | Ording | .......................... | 345/788 |
| 2005/0022135 A1 * | 1/2005 | de Waal | ........................ | 715/788 |
| 2007/0038949 A1 * | 2/2007 | Chan et al. | ..................... | 715/767 |
| 2007/0050729 A1 * | 3/2007 | Kawamura et al. | ........... | 715/781 |
| 2009/0064035 A1 * | 3/2009 | Shibata et al. | ................ | 715/803 |
| 2009/0199128 A1 * | 8/2009 | Matthews et al. | ............. | 715/799 |

FOREIGN PATENT DOCUMENTS

| | | |
|---|---|---|
| JP | 10-198329 A | 7/1998 |
| JP | 2006-185025 A | 7/2006 |
| JP | 2006-277648 A | 10/2006 |

\* cited by examiner

*Primary Examiner* — Ryan Pitaro
(74) *Attorney, Agent, or Firm* — RatnerPrestia

(57) ABSTRACT

An information device includes a controller for controlling the display position and the display size of a window, a semi-maximization instruction receiving part for receiving instructions for semi-maximizing the window, a semi-maximization region setting part for setting a plurality of display regions in which the window can be semi-maximized, and a display region determination part for determining the display region in which the window is semi-maximized. When the semi-maximization instruction receiving part receives the instructions for semi-maximizing the window, the controller allows the window to be enlarged and displayed in the entire area of the display region determined by the display region determination part from the plurality of display regions.

7 Claims, 17 Drawing Sheets

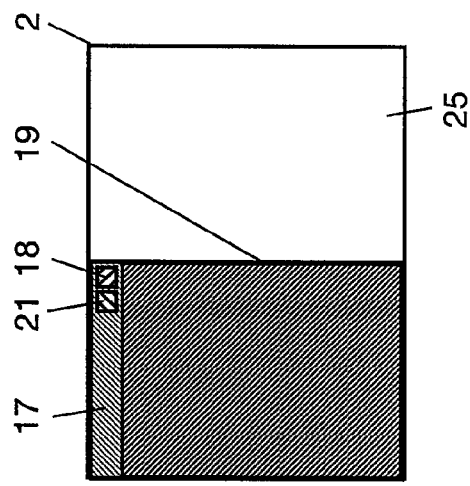
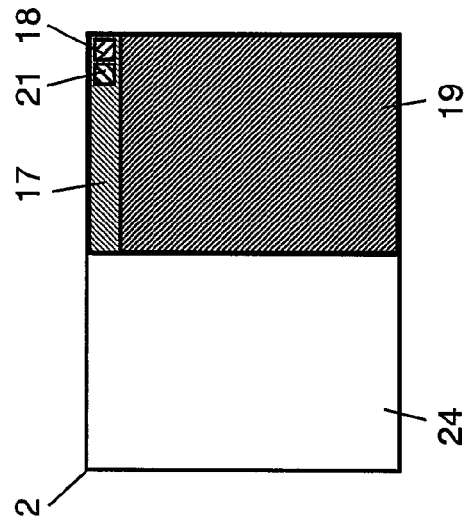
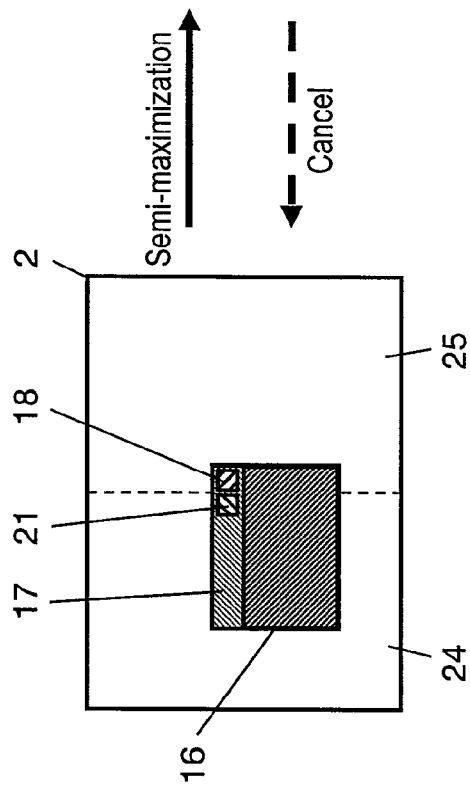
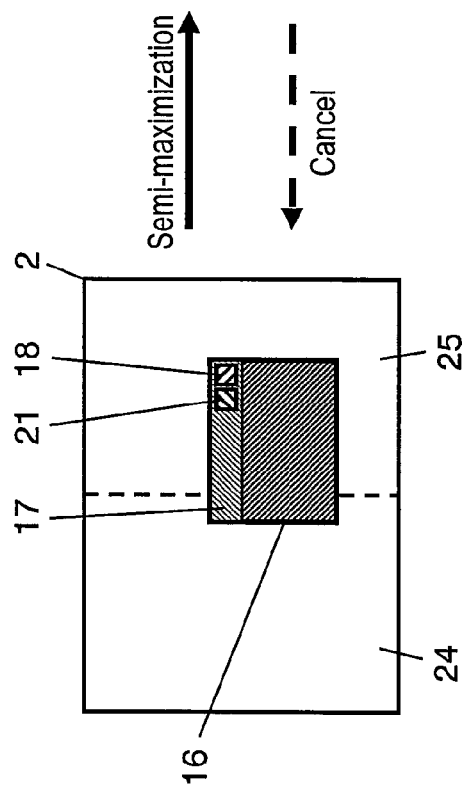
FIG. 7A
FIG. 7B

2

2

2

2

2

2

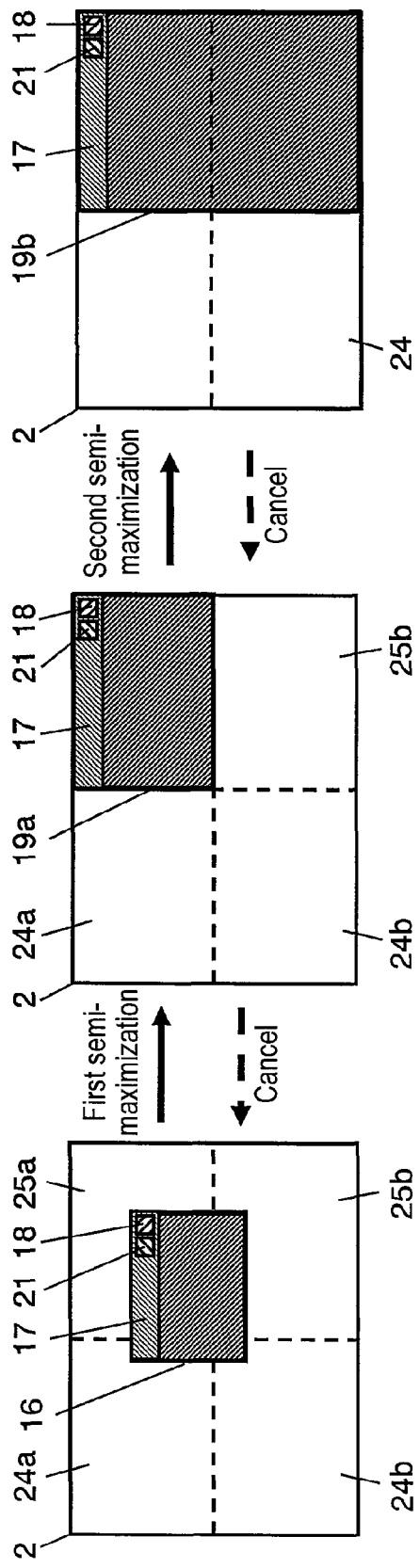
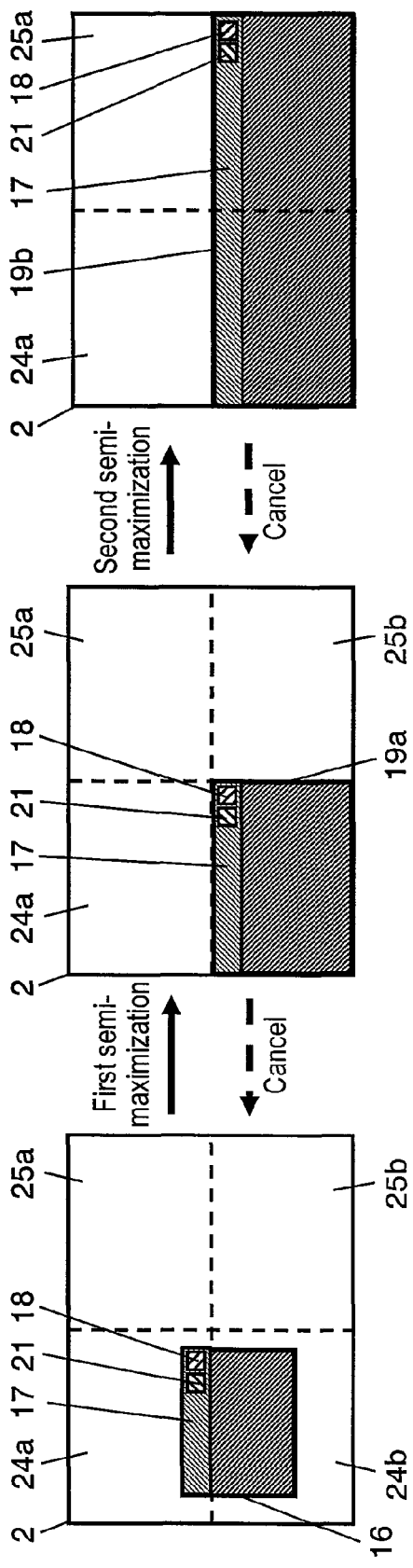
FIG. 10A
FIG. 10B

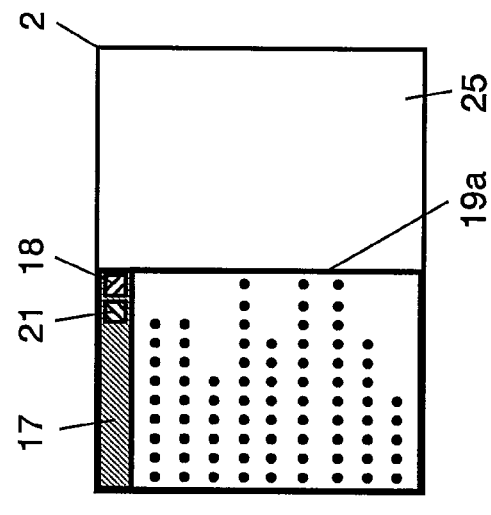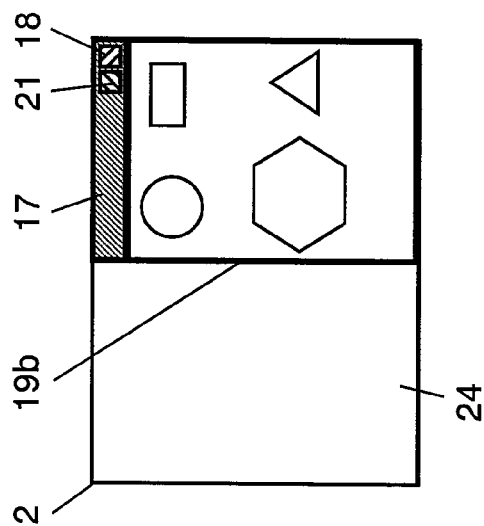
FIG. 17A
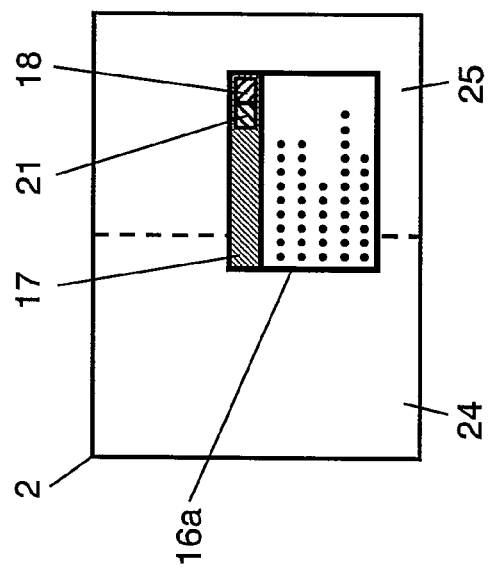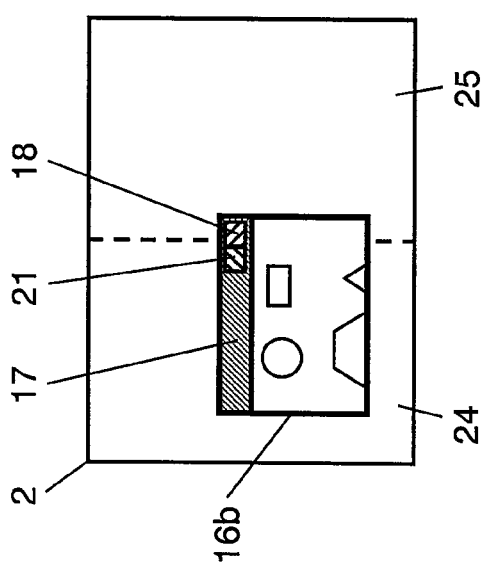
FIG. 17B

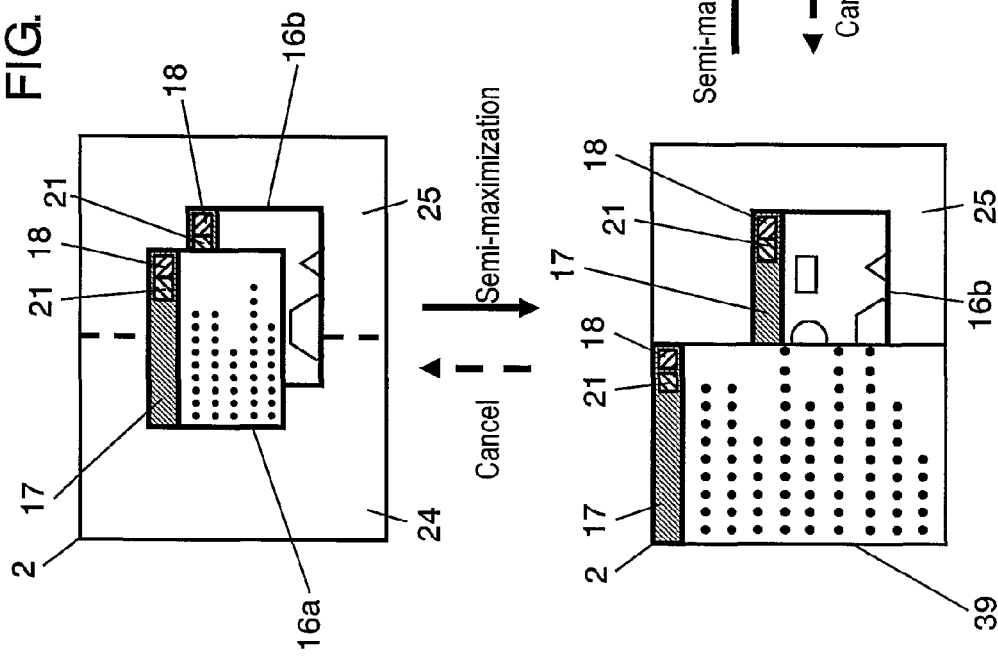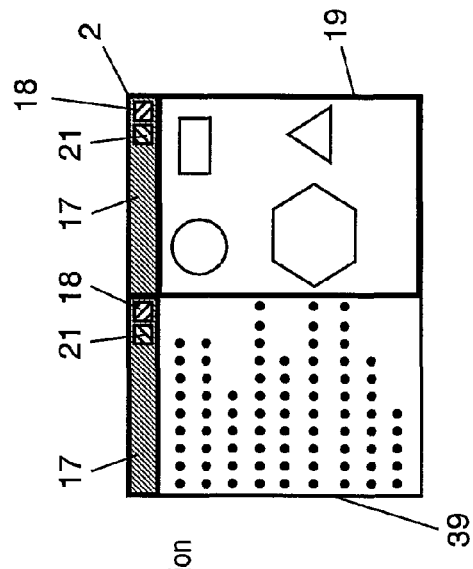

INFORMATION DEVICE AND WINDOW DISPLAY METHOD

BACKGROUND OF THE INVENTION

1. Field of the Invention

The present invention relates to an information device capable of displaying a plurality of windows on a screen, and to a method for displaying a plurality of windows on a screen.

2. Background Art

In recent years, information devices are widely used, which include a CPU (Central Processing Unit), a memory device for storing various programs, an input device such as a keyboard or a pointing device, and an image display device. These information devices have improved in their processing capabilities, allowing a plurality of programs to run concurrently. As a result, it is common to display the calculation results of programs in reduced-size windows (hereinafter, "reduced windows") on the screen of the image display device.

The operability of such information devices has been improved as follows. For example, Japanese Patent Unexamined Publication No. H10-198329 discloses a technique for maximizing a reduced window to fill the entire display screen or reducing the maximized window to the original size by allowing the user to specify a region of a window. The user can specify a region of the window, for example, by positioning the pointer of a pointing device such as a mouse within the region and by clicking the button of the pointing device.

On the other hand, Japanese Patent Unexamined Publication No. 2006-277648 discloses a technique in which when the user chooses to maximize one of a plurality of reduced windows on a display screen, the other reduced windows are minimized to a predetermined size, and the chosen window is enlarged to the region created by the minimization.

Maximizing one window to fill the entire display screen, however, causes operability problems such as that the other windows are hidden behind the maximized window or that it is impossible to open a new window.

The recent increase in size of image display devices has enabled the display of a larger number of reduced windows so as to improve the operability. At the same time, however, when one window is enlarged by minimizing the other windows, the minimized windows decrease their visibility, thus degrading the operability of the image display devices.

SUMMARY OF THE INVENTION

The information device of the present invention, which displays a window capable of changing its display position and its display size on a screen, includes: a controller for controlling the display position and the display size of a window; a semi-maximization instruction receiving part for receiving instructions for semi-maximizing the window; a semi-maximization region setting part for setting a plurality of display regions in which the window can be semi-maximized; and a display region determination part for determining the display region in which the window is semi-maximized, from the plurality of display regions. When the semi-maximization instruction receiving part receives the instructions for semi-maximizing the window, the controller allows the window to be displayed in the entire area of the display region determined by the display region determination part from the plurality of display regions.

This structure allows a reduced window to be efficiently enlarged and displayed in a predetermined region, thus improving visibility and operability when displaying a window on the screen.

In the information device, the display region determination part may determine the display region in which the window is semi-maximized, based on the display position of a reduced window before being semi-maximized. This structure improves operability when enlarging and displaying a reduced window in a predetermined region.

The information device may further include a region setting receiving part for receiving instructions for setting the plurality of display regions, and the semi-maximization region setting part may set the plurality of display regions based on the instructions received by the region setting receiving part. This structure allows the user to arbitrarily set the display regions in which a reduced window can be enlarged to a semi-maximized size, thus further improving the operability.

In the information device, the display region determination part may include a preferred region receiving part for receiving instructions on the association between the application running in the window and the display region in which the window is semi-maximized; and the display region determination part may determine the display region in which the window is semi-maximized, by placing priority on the instructions received by the preferred region receiving part. This structure allows the user to determine the display region in which a reduced window is enlarged to a semi-maximized size according to the application, thus further improving the operability.

The information device may further include a region selection receiving part for receiving instructions for selecting the display region in which the window is semi-maximized, and the display region determination part may determine the display region in which the window is semi-maximized, based on the instructions received by the region selection receiving part. This structure allows the user to arbitrarily determine the display region in which a reduced window is enlarged to a semi-maximized size, thus improving the operability.

The information device may perform a multi-step enlarging process including: first semi-maximization in which the window is enlarged and displayed in the entire area of one of the plurality of display regions that is determined by the display region determination part; and second semi-maximization in which the window is enlarged and displayed in the entire area of at least two adjacent ones of the plurality of display regions. This structure enables enlarging a display region sequentially by first semi-maximization, second semi-maximization, and so on when displaying a reduced window, thus further improving the visibility and operability.

The method of the present invention for displaying a window capable of changing its display position and its display size on a screen, wherein upon receiving instructions for semi-maximizing a reduced window, the reduced window is semi-maximized and displayed in the entire area of one of a plurality of display regions predetermined based on the display position of the reduced window.

This structure allows a reduced window to be efficiently enlarged and displayed in a predetermined region, thus improving visibility and operability when displaying a window on the screen.

In the window display method of the present invention, the display region in which the window is semi-maximized may be determined based on the predetermined association of an application running in the window and the display region to be semi-maximized of the window. This structure allows determining the display region in which a reduced window is enlarged to a semi-maximized size according to the application, thus further improving the operability.

In the window display method of the present invention, a multi-step enlarging process may be performed, which includes: first semi-maximization in which the window is enlarged and displayed in the entire area of one of the plurality of display regions; and second semi-maximization in which the window is enlarged and displayed in the entire area of at least two of the plurality of display regions. This structure enables enlarging a display region sequentially by first semi-maximization, second semi-maximization, and so on when displaying a reduced window, thus further improving the visibility and operability.

BRIEF DESCRIPTION OF THE DRAWINGS

FIG. 7A is a schematic diagram showing an example of semi-maximizing a reduced window in the information device.

FIG. 7B is a schematic diagram showing another example of semi-maximizing a reduced window in the information device.

FIG. 10A is a schematic diagram showing a multi-step operation to semi-maximize a reduced window in an information device according to a second embodiment of the present invention.

FIG. 10B is a schematic diagram showing another multi-step operation to semi-maximize a reduced window in the information device.

FIG. 17A is a schematic diagram showing an example of semi-maximizing a reduced window in association with an application in the information device.

FIG. 17B is a schematic diagram showing another example of semi-maximizing a reduced window in association with an application in the information device.

FIG. 18 is a schematic diagram showing an example of semi-maximizing a plurality of independent reduced windows controlled by different applications, the different applications being in association with semi-maximization regions in the information device.

DETAILED DESCRIPTION OF THE INVENTION

Embodiments of the information device of the present invention will be described as follows with reference to drawings.

First Embodiment

Figure 1:
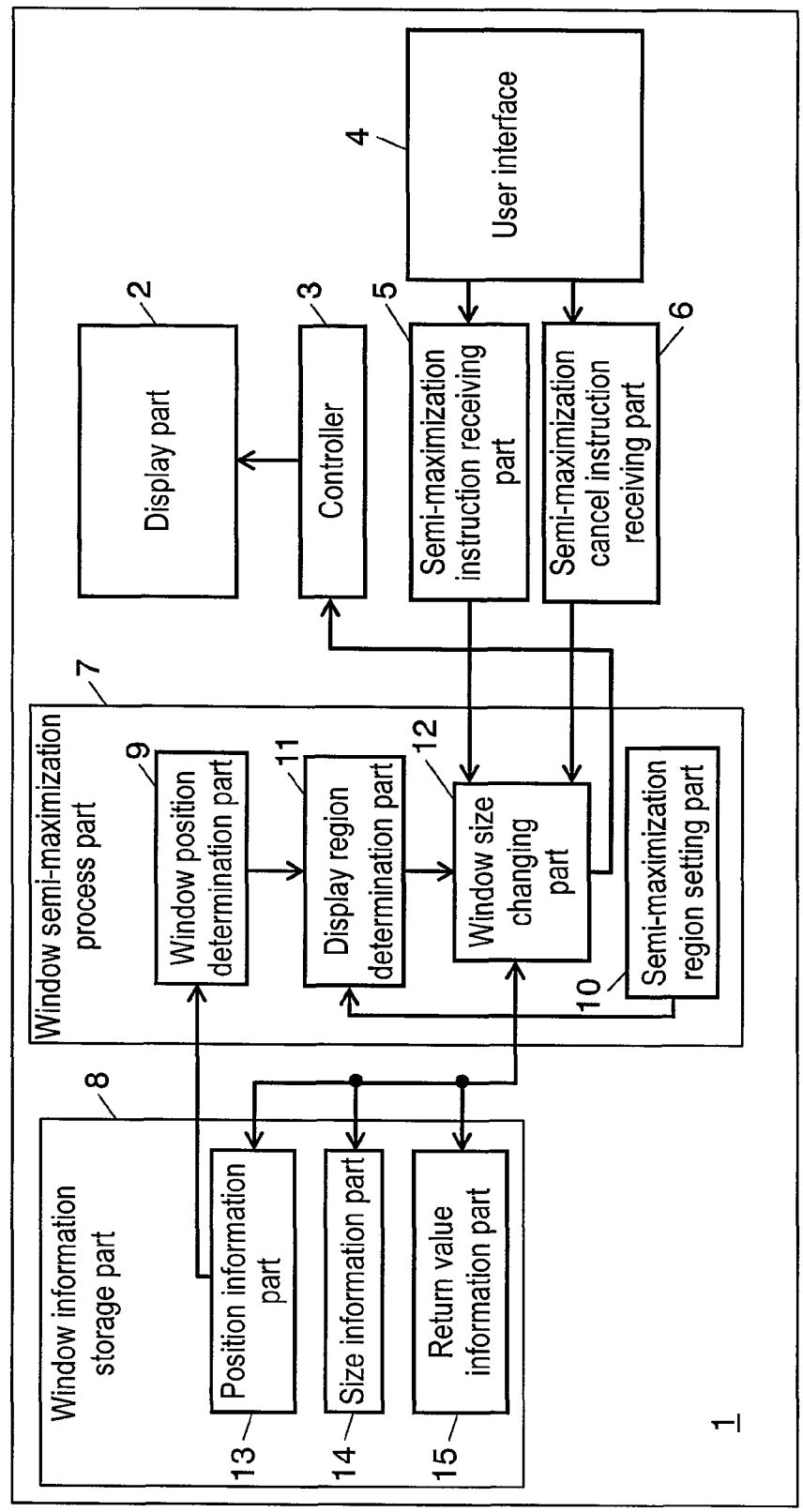
FIG. 1 is a block diagram of an information device according to a first embodiment of the present invention.

FIG. 1 is a block diagram of information device 1 according to a first embodiment of the present invention. Information device 1 includes display part 2, controller 3, user interface 4, semi-maximization instruction receiving part 5, semi-maximization cancel instruction receiving part 6, window semi-maximization process part 7, and window information storage part 8. Display part 2 displays images on its screen. Controller 3 controls the display position, the display size, and other information of a window displayed on the screen. User interface 4 receives input from the user of information device 1. Semi-maximization instruction receiving part 5 receives instructions for semi-maximizing a reduced window, of the instructions that user interface 4 has received from the user. Semi-maximization cancel instruction receiving part 6 receives instructions for cancelling the semi-maximization, of the instructions that user interface 4 has received from the user. Window semi-maximization process part 7 performs processes required to display a window in a semi-maximized size. Window information storage part 8 stores information about the windows. The semi-maximization of a reduced window indicates the changing of the display position and the display size of the reduced window, but does not include the enlargement of the reduced window to the maximized size, which will be described later. The operation of semi-maximization will be described in detail later.

Display part 2 is composed of a common image display device such as an LCD (liquid crystal display) or an organic EL (Electroluminescence) display. Display part 2 displays the calculation results of the programs running on information device 1. Display part 2 may be integrated into information device 1, or it is possible to provide an image display device outside information device 1 and to use it as display part 2.

User interface 4, which is composed of a common information input device such as a mouse, other pointing device, or a keyboard, transmits inputs of instructions, information, and the like from the user to information device 1. User interface 4 may be formed by integrating display part 2 with a general touch panel.

Window information storage part 8 includes position information part 13, size information part 14, and return value information part 15. Position information part 13 stores information on the display position of a window which is on the screen of display part 2. Size information part 14 stores information on the display size of a window which is on the screen. Return value information part 15 stores information on the original display position and the original display size that a window had before being semi-maximized. This speeds up the response to instructions for cancelling the semi-maximization after the position and size of the window is once semi-maximized, thereby speeding up the reduction of the window to its original position and size.

Window semi-maximization process part 7 includes window position determination part 9, semi-maximization region setting part 10, display region determination part 11, and window size changing part 12. Window position determination part 9 determines the display position of a reduced window based on the information stored in position information part 13. Semi-maximization region setting part 10 stores information on semi-maximization regions. Display region determination part 11 determines the display region in which a window is semi-maximized. Window size changing part 12 changes information on the display position and the display size of a window.

In information device 1, first of all, semi-maximization instruction receiving part 5 receives instructions for semi-maximizing a reduced window Then, display region determination part 11 determines the display region in which the reduced window is semi-maximized, based on information obtained from window position determination part 9 and semi-maximization region setting part 10. Window size changing part 12 changes the information on the display position and the display size of the reduced window so as to enlarge the window to the entire area of the display region determined by display region determination part 11. Controller 3 allows displaying the window that has been enlarged to the entire area of the display region determined by display region determination part 11, based on the information received from window size changing part 12. In other words, controller 3 controls display part 2 to display the window in a semi-maximized size.

When semi-maximization cancel instruction receiving part 6 receives instructions for cancelling the semi-maximization, window size changing part 12 reads the original information of the window stored in return value information part 15. Controller 3 reduces the window to the original display position and the original display size based on the original information read by window size changing part 12.

Window information storage part 8 may be configured to store information on the display position and the display size of a semi-maximized window. This structure allows controller 3 to return a window maximized to the entire screen of display part 2 to a window semi-maximized to have the original display position and the original display size. This is because upon receiving the instructions for returning the maximized window to the original semi-maximized size, controller 3 operates based on the information stored in window information storage part 8.

These blocks may be composed of either electronic circuits or programs designed to run on a microcomputer so as to operate in the same way as the electronic circuits.

A window display configuration in the present embodiment will be described as follows.

Figure 2:
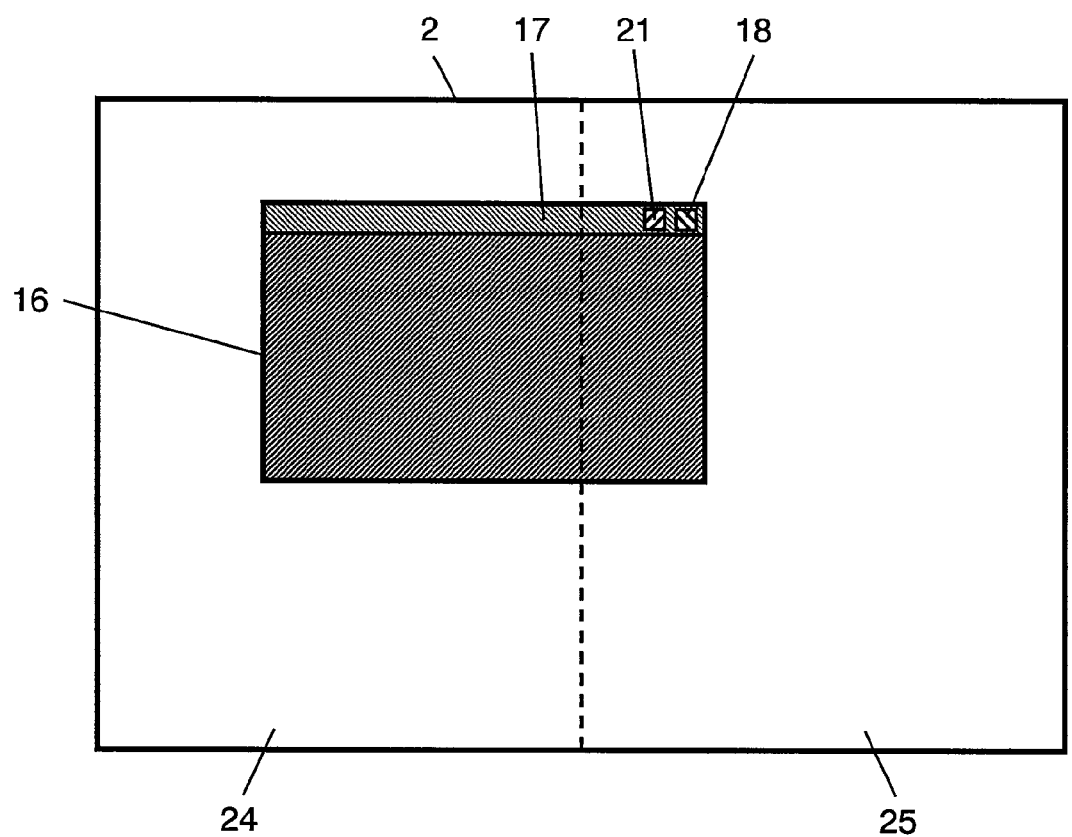
FIG. 2 shows a reduced-window display configuration in the information device.
Figure 3A:
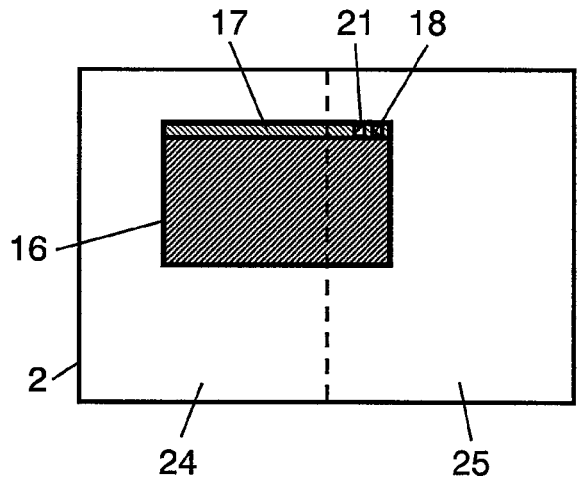
FIG. 3A shows a change in a window display configuration in the information device.
Figure 3B:
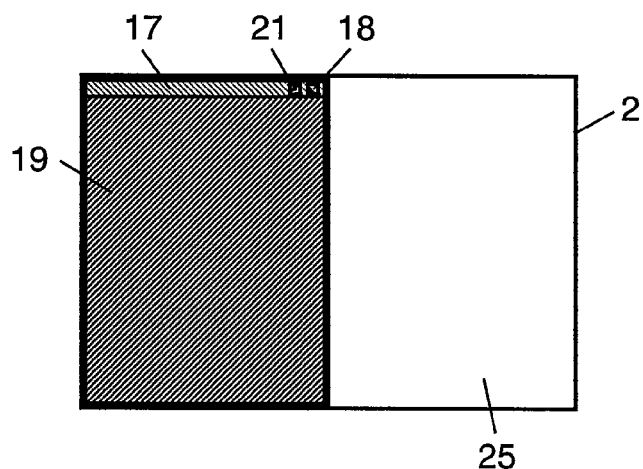
FIG. 3B shows another change in the window display configuration in the information device.
Figure 3C:
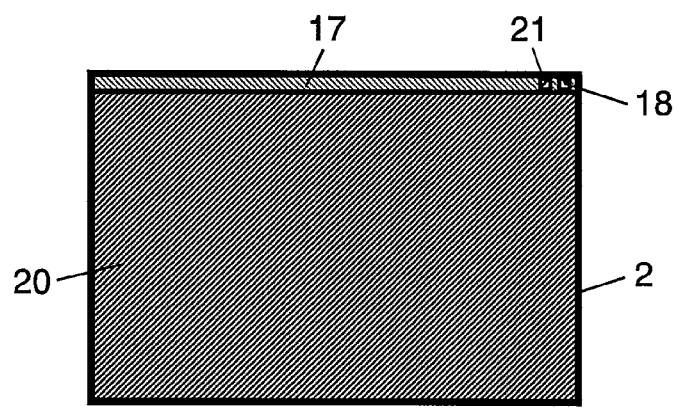
FIG. 3C shows another change in the window display configuration in the information device.

FIG. 2 shows a reduced-window display configuration in information device 1 according to the present embodiment. FIGS. 3A, 3B, and 3C show changes in the window display configuration in information device 1. In order to distinguish from reduced window 16, a window in a semi-maximized size and a window in a maximized size are referred to as a "semi-maximized window" and a "maximized window", respectively. FIGS. 3A, 3B, and 3C show a reduced-window display configuration, a semi-maximized-window display configuration, and a maximized-window display configuration, respectively.

As shown in FIG. 2, reduced window 16 is a window located in the display region of display part 2 in order to display the calculation results of an application. Reduced window 16 includes title display region 17 above the region in which the calculation results of an application are displayed. Title display region 17 includes semi-maximize button 18 and semi-maximize cancel button 21. Title display region 17, semi-maximize button 18, and semi-maximize cancel button 21 are also displayed in semi-maximized window 19 and maximized window 20. As shown in FIG. 2, the screen of display part 2 is divided into two regions: first semi-maximization region 24 and second semi-maximization region 25, which correspond to the left and right halves, respectively, of the screen. Each of reduced window 16, semi-maximized window 19, and maximized window 20 includes a vertical and/or horizontal scrollbar to scroll through the information; however, the scrollbars are not illustrated for simplification in FIG. 2 and other drawings described below.

The following is a description of changes in the window display configuration. Assume, as shown in FIG. 3A, that the user presses semi-maximize button 18 via user interface 4, for example, by clicking a pointing device when reduced window 16 is on the screen of display part 2. Reduced window 16 is enlarged and displayed in the entire area of either first semi-maximization region 24 or second semi-maximization region 25. In other words, reduced window 16 is semi-maximized to become semi-maximized window 19. In FIG. 3B, reduced window 16 is semi-maximized in first semi-maximization region 24. The determination as to which of semi-maximization regions 24 and 25 reduced window 16 is semi-maximized in is determined based on the display position of reduced window 16.

Assume, on the other hand, that the user presses semi-maximize cancel button 21 via user interface 4 when semi-maximized window 19 is on the screen. Semi-maximized window 19 is reduced to reduced window 16 with the original size as shown in FIG. 3A.

Assume that the user again presses semi-maximize button 18 via user interface 4 when semi-maximized window 19 is on the screen. Semi-maximized window 19 is enlarged and displayed on the entire screen of display part 2 as shown in FIG. 3C. Thus, semi-maximized window 19 is maximized to become maximized window 20.

Assume that the user presses semi-maximize cancel button 21 via user interface 4 when maximized window 20 is on the screen. Maximized window 20 is reduced to semi-maximized window 19 with the original size as shown in FIG. 3B.

There are cases where reduced window 16 has a larger window size than a semi-maximized window. For example, reduced window 16 may be displayed as large as the entire screen of display part 2. In such cases, a reduced window, when semi-maximized, appears to be smaller than the semi-maximized window. That is, a reduced window, when semi-maximized, has a smaller window size than the semi-maximized window. In the present embodiment, the terms "reduced window", "semi-maximized window", and "maximized window" are also applied in such cases.

FIGS. 2 and 3A each show a dashed boarder line in the middle of the screen of display part 2. The boarder line is not actually displayed on the screen but is shown only to clarify the boundary between first semi-maximization region 24 and second semi-maximization region 25.

In FIG. 3C, both semi-maximize button 18 and semi-maximize cancel button 21 are displayed. Alternatively, it is possible not to display semi-maximize button 18 in a maximized window because it is unnecessary to define the operation to semi-maximize a maximized window. Similarly, it is possible not to display semi-maximize cancel button 21 in reduced window 16.

Figure 4:
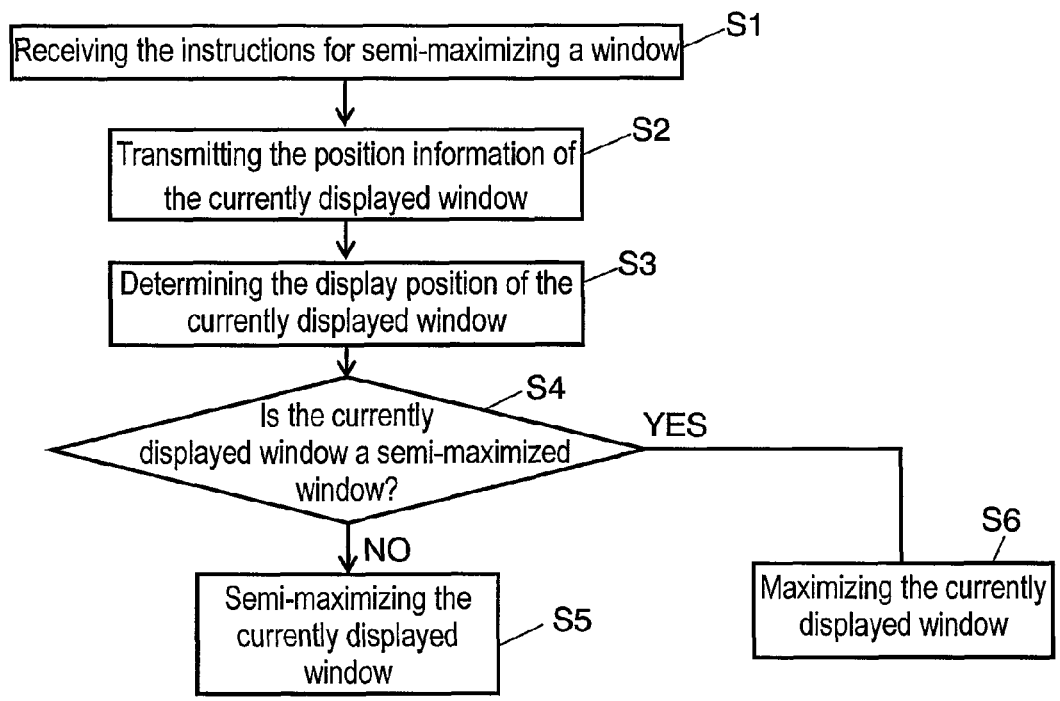
FIG. 4 is a flowchart showing an operation of the information device when the user presses a semi-maximize button.
Figure 5:
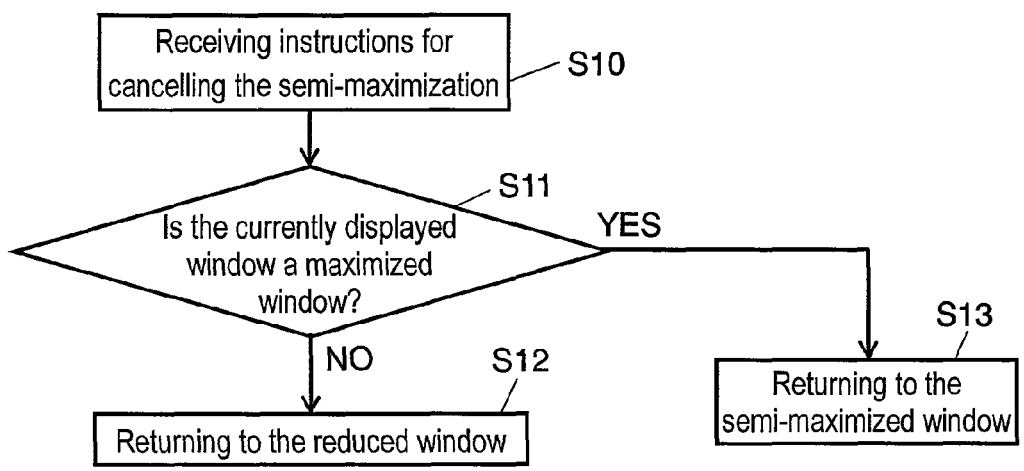
FIG. 5 is a flowchart showing an operation of the information device when the user presses a semi-maximize cancel button.

The operation to switch the window display configuration in the present embodiment will be described using flowcharts as follows. FIG. 4 is a flowchart showing an operation of information device 1 when the user presses semi-maximize button 18. FIG. 5 is a flowchart showing an operation of information device 1 when the user presses semi-maximize cancel button 21.

The operation of information device 1 when the user presses semi-maximize button 18 will be described as follows with reference to FIG. 4. Assume that the user presses semi-maximize button 18 via user interface 4 when a window is on the screen. Semi-maximization instruction receiving part 5 receives the "instructions for semi-maximizing a window" provided by pressing semi-maximize button 18 (Step S1). The instructions for semi-maximizing a window can be provided by the user moving the pointer of the pointing device to semi-maximize button 18 on the screen of display part 2 and clicking the click button of the pointing device provided as user interface 4. The present invention is not limited to this; for example, it is possible to assign a function key on a keyboard provided as user interface 4 to semi-maximize a window.

Then, semi-maximization instruction receiving part 5 transmits a signal indicating the reception of the "instructions for semi-maximizing a window" to window size changing part 12.

In response to this, window information storage part 8 transmits the position information of the currently displayed window stored in position information part 13 to window position determination part 9 (Step S2). When, for example, reduced window 16 is on the screen, window information storage part 8 transmits the position information of reduced window 16. Return value information part 15 stores information on the display position and information on the display size of the currently displayed window.

Then, window position determination part 9 determines the display position of the currently displayed window on the screen of display part 2 from its position information received from window information storage part 8 (Step S3).

If the currently displayed window is not a semi-maximized window, that is, if the currently displayed window is reduced window 16 (NO in Step S4), display region determination part 11 determines the display region in which semi-maximized window 19 is displayed. The display region is determined based on the determination result of window position determination part 9 and the information on the semi-maximization regions held by semi-maximization region setting part 10. Then, window size changing part 12 changes the information on the semi-maximization of the currently displayed window. Controller 3 semi-maximizes the currently displayed window based on the information received from window size changing part 12 (Step S5).

For example, when window position determination part 9 determines that the center of gravity of reduced window 16 is in first semi-maximization region 24, display region determination part 11 determines to semi-maximize reduced window 16 in first semi-maximization region 24. Window size changing part 12 changes the information so that the currently displayed window is enlarged to fill the entire first semi-maximization region 24. Reduced window 16, which is a square in the present embodiment, may be a polygon, oblong, or any other planar shape to implement the present invention. The term "center of gravity" here means a point generally defined as the center of gravity of a planar shape. In the case of a square as in the present embodiment, the point represents the arithmetic mean of the coordinates of the intersection of two diagonals of the square. In the case of a polygon, the point represents the arithmetic mean of the coordinates of the apexes of the polygon. In other words, the point represents the center of the window on the screen.

In Step 5, the information on the display position and the information on the display size of the semi-maximized window are stored in window information storage part 8.

When the currently displayed window is a semi-maximized window, that is, when the currently displayed window is semi-maximized window 19 (YES in Step S4), window size changing part 12 changes the information on the maximization of the currently displayed window. Controller 3 maximizes the currently displayed window based on the information received from window size changing part 12 (Step S6). At the same time, the region information indicating the display region in which semi-maximized window 19 was semi-maximized is stored to window information storage part 8. The reason for this storage is to store the region in which maximized window 20, when returned to semi-maximized window 19, is displayed as will be described later.

The determination in Step S4 is performed in window size changing part 12. This is because window size changing part 12, which manages the information on the size of a currently displayed window, can easily determine whether the currently displayed window is reduced window 16, semi-maximized window 19, or maximized window 20.

In the present embodiment, information device 1 operates based on this flowchart so as to semi-maximize reduced window 16 and to maximize semi-maximized window 19.

Next, the operation of information device 1 when the user presses semi-maximize cancel button 21 will be described with reference to FIG. 5.

Assume that the user presses semi-maximize cancel button 21 via user interface 4 to cancel semi-maximization when a window is on the screen. Semi-maximization cancel instruction receiving part 6 receives "instructions for cancelling the semi-maximization" provided by pressing semi-maximize cancel button 21 (Step S10). The method for providing instructions for cancelling the semi-maximization is not described because it is the same as the method for providing instructions for the semi-maximization described above.

Semi-maximization cancel instruction receiving part 6 transmits a signal indicating the reception of the "instructions for cancelling the semi-maximization" to window size changing part 12.

Window size changing part 12 reads the position information and the size information from position information part 13 and size information part 14, respectively, included in window information storage part 8. Then, window size changing part 12 determines whether the currently displayed window is either maximized window 20 or semi-maximized window 19 (Step S11).

When the currently displayed window is not maximized window 20, that is, when the currently displayed window is semi-maximized window 19 (NO in Step S11), the original information of the currently displayed window stored in return value information part 15 is read out and transmitted to window size changing part 12. As a result, window size changing part 12 changes the information on the reduction of the currently displayed window. Controller 3 allows display part 2 to display the currently displayed window as reduced window 16 with the original display position and original display size based on the information received from window size changing part 12 (Step S12).

When the currently displayed window is, on the other hand, maximized window 20 (YES in Step S11), window semi-maximization process part 7 acquires the region information required to semi-maximize the window from window information storage part 8. Window size changing part 12 changes the information on the semi-maximization of the currently displayed window. Controller 3 allows display part 2 to display the currently displayed window as semi-maximized window 19 with the original display position and the original display size based on the information received from window size changing part 12 (Step S13).

The determination in Step S11 is performed by window size changing part 12 because of the same reason as the determination in Step S4.

In the present embodiment, information device 1 operates based on this flowchart so as to return maximized window 20 to the original semi-maximized window 19 or to return semi-maximized window 19 to the original reduced window 16.

Although not illustrated, if the user presses semi-maximize cancel button 21 when reduced window 16 is on the screen, it is possible to perform minimization in such a manner as to display title display region 17 only.

How to determine the display region in which reduced window 16 is semi-maximized will be described as follows.

Figure 6:
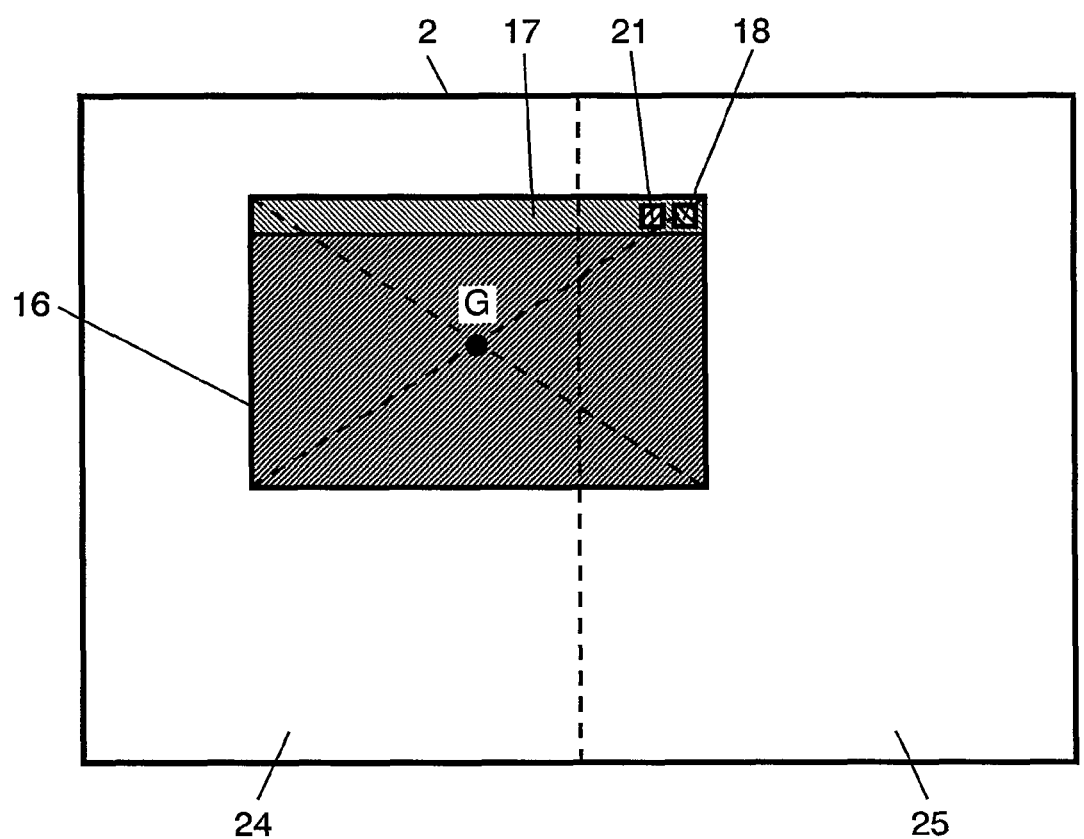
FIG. 6 is a schematic diagram showing an example of how to determine the display region in which a reduced window is semi-maximized in the information device.

FIG. 6 is a schematic diagram showing an example of how to determine the display region in which reduced window 16 is semi-maximized in information device 1 according to the first embodiment.

In the present embodiment, the display region in which a window is semi-maximized is determined based on the display position of reduced window 16. More specifically, first of all, window position determination part 9 calculates the position of the center of gravity G of reduced window 16. In the present embodiment, the position of center of gravity G can be calculated by noting that reduced window 16 is a square. In other words, the position of center of gravity G of reduced window 16 can be calculated by adding the coordinates of the four corners of the outer periphery of reduced window 16 and striking an average. Then, display region determination part 11 determines whether the center of gravity G is either in first semi-maximization region 24 or in second semi-maximization region 25, and determines that the region having the center of gravity G is the display region in which the window is semi-maximized.

FIGS. 7A and 7B are schematic diagrams showing examples of semi-maximizing reduced window 16 in information device 1 according to the first embodiment. When the center of gravity G of reduced window 16 is in first semi-maximization region 24 as shown in FIG. 7A, reduced window 16 is enlarged and displayed as a semi-maximized window in the entire area of first semi-maximization region 24. On the other hand, when the center of gravity G of reduced window 16 is in second semi-maximization region 25 as shown in FIG. 7B, reduced window 16 is enlarged and displayed as a semi-maximized window in the entire area of second semi-maximization region 25.

Figure 8:
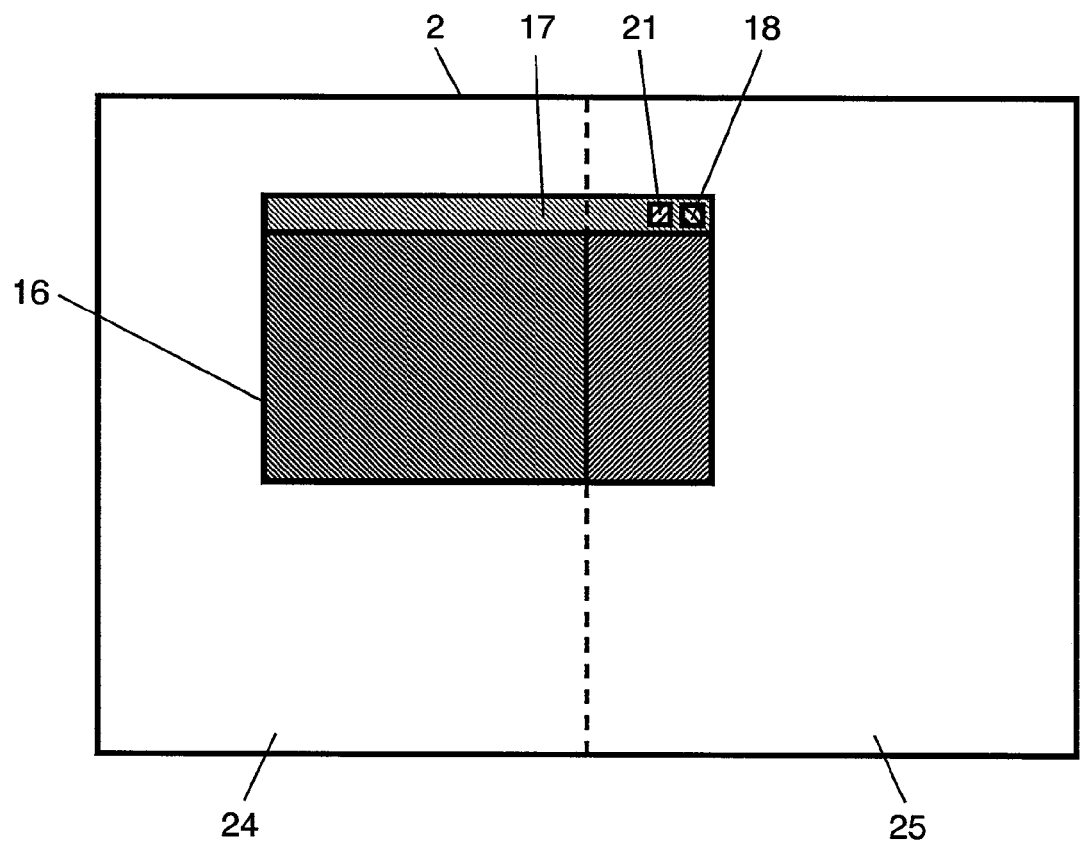
FIG. 8 is a schematic diagram showing another example of how to determine the display region in which a reduced window is semi-maximized in the information device.

The display region in which reduced window 16 is semi-maximized can be determined by methods other than the method based on the center of gravity of reduced window 16 as shown in FIGS. 7A and 7B in the present invention. FIG. 8 is a schematic diagram showing another example of how to determine the display region in which reduced window 16 is semi-maximized in information device 1 according to the first embodiment. As shown in FIG. 8, it is possible to compare the area of reduced window 16 that is included in first semi-maximization region 24 and the area of reduced window 16 that is included in second semi-maximization region 25, and to semi-maximize reduced window 16 in the region that includes the larger area. Although not illustrated, it is also possible to compare the total length of the sides of reduced window 16 that is included in first semi-maximization region 24 and the total length of the sides of reduced window 16 that is included in second semi-maximization region 25, and to semi-maximize reduced window 16 in the region that includes the longer total length.

Figure 9A:
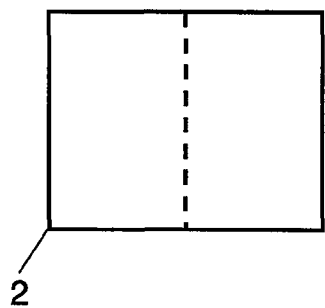
FIG. 9A shows an example of setting semi-maximization regions in the information device.
Figure 9B:
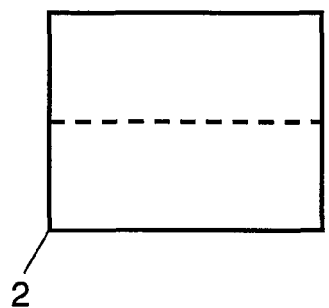
FIG. 9B shows another example of setting semi-maximization regions in the information device.
Figure 9C:
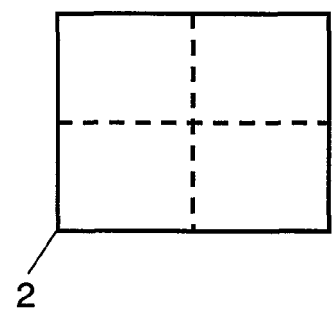
FIG. 9C shows another example of setting semi-maximization regions in the information device.
Figure 9D:
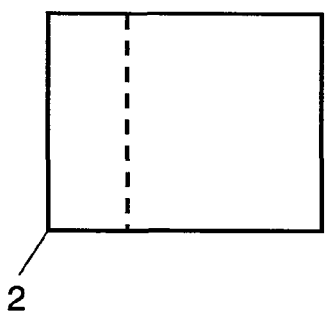
FIG. 9D shows another example of setting semi-maximization regions in the information device.
Figure 9E:
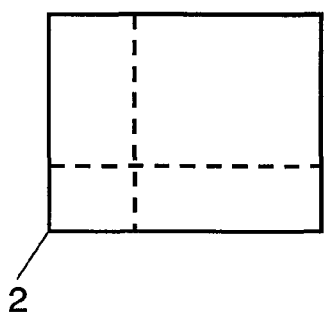
FIG. 9E shows another example of setting semi-maximization regions in the information device.
Figure 9F:
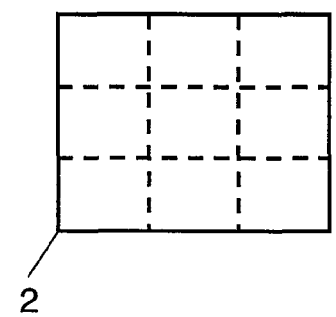
FIG. 9F shows another example of setting semi-maximization regions in the information device.

FIGS. 9A, 9B, 9C, 9D, 9E, and 9F show examples of setting semi-maximization regions in information device 1 according to the first embodiment. In the present embodiment, as shown in FIG. 9A, the screen of display part 2 is equally divided into two regions (right and left) in which a window can be semi-maximized; however, the present invention is not limited to this structure. For example, the screen of display part 2 may be equally divided into two regions (upper and lower) as shown in FIG. 9B; equally divided into four regions (two by two) as shown in FIG. 9C; unequally divided into several regions as shown in FIGS. 9D and 9E; or equally divided into nine regions (three by three) as shown in FIG. 9F. The screen of display part 2 may be divided into an even larger number of regions.

As described above, information device 1 may previously store the settings and combinations of the semi-maximization regions, allowing the user to appropriately select one setting. Alternatively, information device 1 may be designed to allow the user to previously set the semi-maximization regions. This increases user-friendliness. In the present embodiment, examples of the settings of the semi-maximization regions are shown in FIGS. 9A, 9B, 9C, 9D, 9E, and 9F.

As described above, in the present embodiment, when semi-maximization instruction receiving part 5 receives instructions for semi-maximizing reduced window 16, reduced window 16 is semi-maximized and displayed in the entire area of one of the plurality of display regions previously set based on the display position of reduced window 16. This improves visibility and operability when displaying a window on the screen of the image display device of an information device which executes a plurality of programs concurrently and displays the calculation results of the programs in a plurality of reduced windows on the screen.

In wide screens with an aspect ratio of 16:9, which have rapidly come into widespread use, when a window is semi-maximized and displayed in one of two equally divided regions (right and left) of the screen, the semi-maximized window has an aspect ratio of 8:9, which is close to the aspect ratio of a square. This is particularly effective in the window display method according to the present embodiment.

When a wide screen with an aspect ratio of 16:9 is placed lengthwise, the display screen can be equally divided into two regions (upper and lower) to provide the same effect.

Second Embodiment

The first embodiment shows the case where when semi-maximization instruction receiving part 5 receives instructions for semi-maximizing a window, semi-maximization is performed just once. In other words, in response to the instructions for semi-maximizing a window, reduced window 16 is enlarged to semi-maximized window 19, or semi-maximized window 19 is enlarged to maximized window 20. The second embodiment, on the other hand, provides a plurality of semi-maximized windows of different sizes so that a semi-maximization process with two or more steps including first semi-maximization and second semi-maximization is performed, thus further improving operability and visibility in information device 1.

FIGS. 10A and 10B are schematic diagrams showing multi-step operations to semi-maximize reduced window 16 according to the second embodiment. In the present embodiment, the screen of display part 2 is divided into four regions shown in FIGS. 10A and 10B, that is, first semi-maximization region 24a, second semi-maximization region 25a, third semi-maximization region 24b, and fourth semi-maximization region 25b. First to fourth semi-maximization regions 24a, 25a, 24b, and 25b correspond to the upper left, upper right, lower left, and lower right, respectively, of the screen.

In the present embodiment, if the user presses semi-maximize button 18 of reduced window 16 whose center of gravity is in second semi-maximization region 25a as shown in FIG. 10A, reduced window 16 is subjected to "first semi-maximization". As a result, the currently displayed window is enlarged to the entire area of second semi-maximization region 25a, making reduced window 16 first semi-maximized window 19a. On the other hand, if the user presses semi-maximize button 18 of reduced window 16 whose center of gravity is in third semi-maximization region 24b as shown in FIG. 10B, reduced window 16 is subjected to "first semi-maximization" so as to be enlarged to the entire area of third semi-maximization region 24b and becomes first semi-maximized window 19a.

Next, assume that the user presses semi-maximize button 18 of first semi-maximized window 19a. In FIG. 10A, first semi-maximized window 19a is subjected to "second semi-maximization" so as to be enlarged to the entire area of fourth semi-maximization region 25b adjacent to second semi-maximization region 25a. As a result, first semi-maximized window 19a becomes second semi-maximized window 19b. In FIG. 10B, first semi-maximized window 19a is subjected to "second semi-maximization" so as to be enlarged to the entire area of fourth semi-maximization region 25b adjacent to third semi-maximization region 24b. As a result, first semi-maximized window 19a becomes second semi-maximized window 19b.

As described above, according to the present embodiment, a multi-step semi-maximization is performed which includes first semi-maximization in which a window is enlarged and displayed in the entire area of one of a plurality of display regions, and second semi-maximization in which the window is enlarged and displayed in the entire area of at least two adjacent ones of the plurality of display regions. This structure allows the user to enlarge a display region in steps simply by pressing semi-maximize button 18, thus further improving visibility and operability of information device 1.

Although not illustrated, in FIGS. 10A and 10B in which the screen of display part 2 is divided into four regions, the currently displayed window can be maximized by the user pressing semi-maximize button 18 of second semi-maximized window 19b. In the case of dividing the screen into 9, 16, or more regions, multi-step semi-maximization including "third semi-maximization", "fourth semi-maximization", and so on can be performed.

Thus dividing the screen into a large number of regions such as 9 or 16 to perform semi-maximization in multi steps as in the present embodiment is especially effective when information device 1 uses as display part 2 a large-screen display device which has rapidly come into widespread use.

Third Embodiment

In the first embodiment, semi-maximization is performed using the information on the semi-maximization regions previously stored in semi-maximization region setting part 10. In the third embodiment, on the other hand, the user can arbitrarily set the semi-maximization regions, thus further improving operability of information device.

Figure 11:
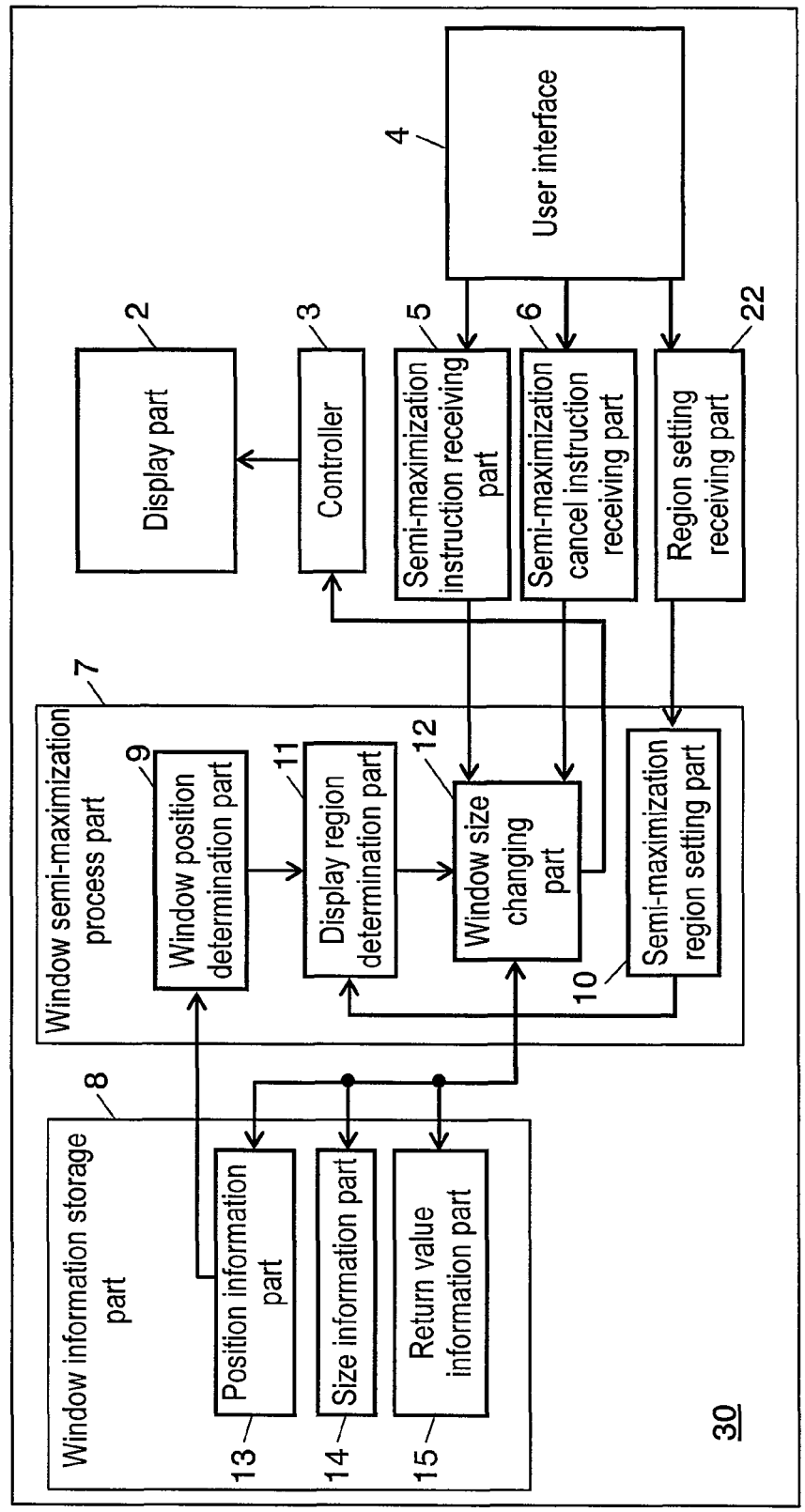
FIG. 11 is a block diagram of an information device according to a third embodiment of the present invention.

FIG. 11 is a block diagram of information device 30 according to the third embodiment. Information device 30 of FIG. 11 differs from information device 1 of FIG. 1 in having region setting receiving part 22. The structures and operations of the components other than region setting receiving part 22 are identical to those of the components of FIG. 1. Like components are labeled with like reference numerals with respect to FIG. 1 and hence the description thereof will be omitted.

As shown in FIG. 11, region setting receiving part 22 receives instructions for setting the semi-maximization regions, of the instructions that user interface 4 has received from the user. The instructions received by region setting receiving part 22 are transmitted to semi-maximization region setting part 10. Semi-maximization region setting part 10 sets the semi-maximization regions, based on the instructions received from region setting receiving part 22. The instructions received by region setting receiving part 22 are stored therein until new instructions are received.

Thus, in the present embodiment, the user can arbitrarily set the semi-maximization regions, thus further improving operability of information device 30.

Fourth Embodiment

In the first embodiment, the display region in which a window is semi-maximized is determined based on the display position of a reduced window. In the fourth embodiment, on the other hand, the user can arbitrarily determine the display region in which a reduced window is semi-maximized, thus further improving operability of information device.

Figure 12:
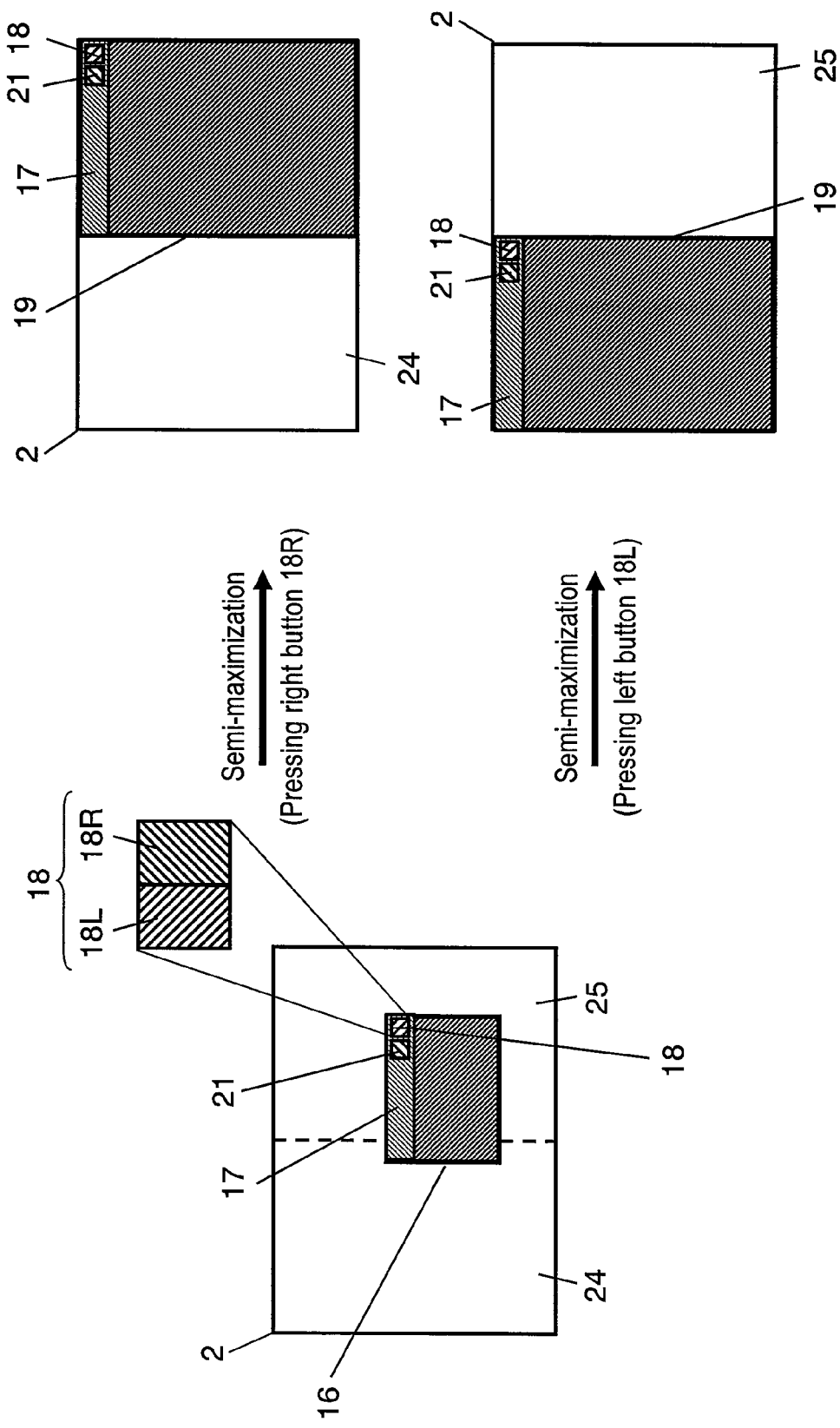
FIG. 12 shows a reduced-window display configuration in an information device according to a fourth embodiment of the present invention.

FIG. 12 shows a reduced-window display configuration in the information device according to the fourth embodiment. In the present embodiment, the screen of display part 2 is divided into two regions in the same manner as in FIG. 2, that is, first and second semi-maximization regions 24 and 25, which correspond to the left and right halves, respectively, of the screen.

The reduced-window display configuration of FIG. 12 differs from that of the first embodiment of FIG. 1 in that semi-maximize button 18 is divided into right button 18R and left button 18L, which correspond to the semi-maximization regions. If the user presses right button 18R as shown in FIG. 12, reduced window 16 is enlarged to a semi-maximized size in the entire area of second semi-maximization region 25, which is defined as the region corresponding to right button 18R. If the user presses left button 18L, on the other hand, reduced window 16 is enlarged to a semi-maximized size in the entire area of first semi-maximization region 24, which is defined as the region corresponding to left button 18L.

Figure 13:
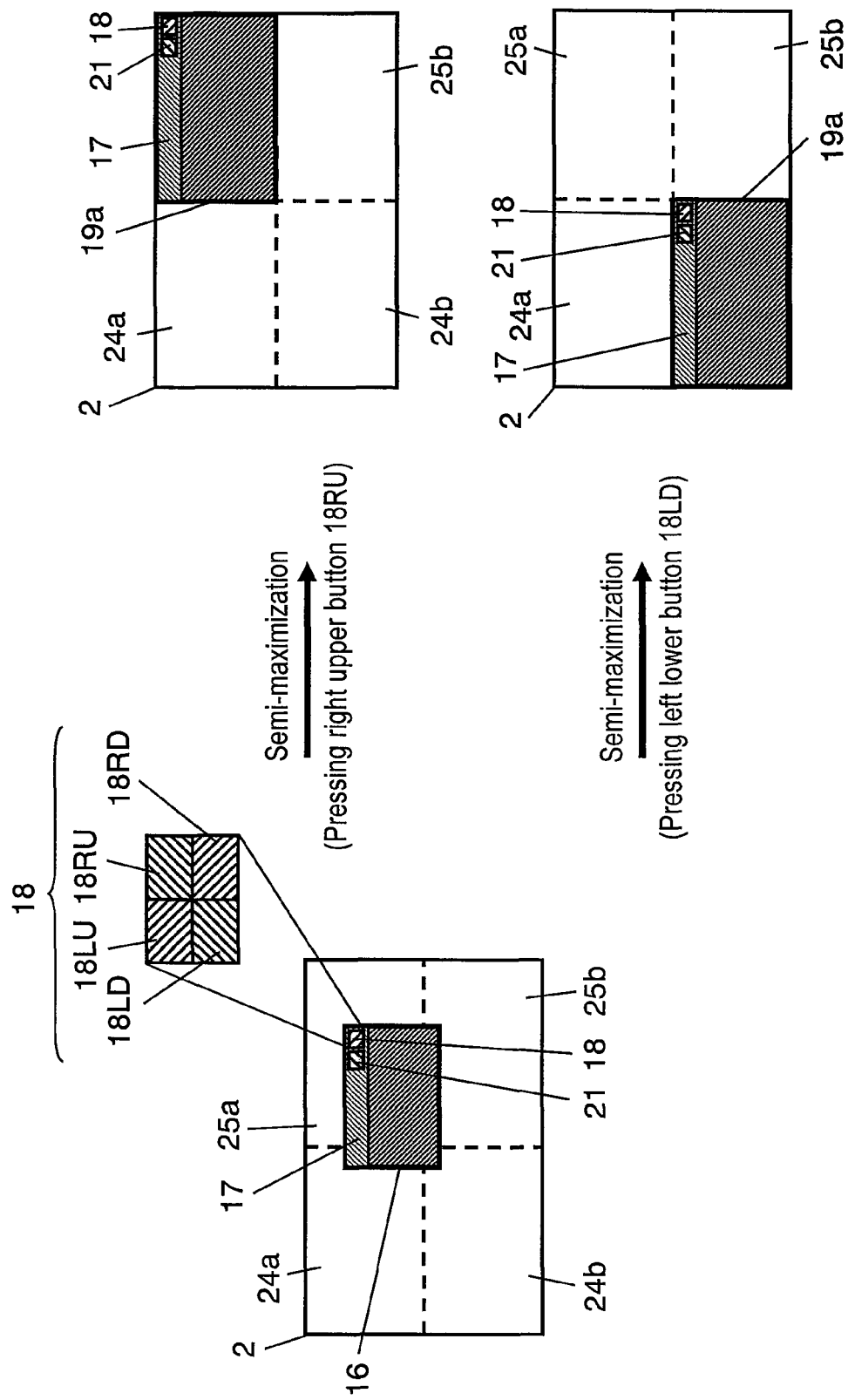
FIG. 13 shows another reduced-window display configuration in the information device.

FIG. 13 shows another reduced-window display configuration in the information device according to the fourth embodiment. The following is a description of a case where the screen of display part 2 is divided into four regions in the same manner as in FIG. 10, that is, first semi-maximization region 24a, second semi-maximization region 25a, third semi-maximization region 24b, and fourth semi-maximization region 25b shown in FIG. 13. First to fourth semi-maximization regions 24a, 25a, 24b, and 25b correspond to the upper left, upper right, lower left, and lower right, respectively, of the screen. In this case, semi-maximize button 18 is divided into right upper button 18RU, right lower button 18RD, left upper button 18LU, and left lower button 18LD.

If the user presses right upper button 18RU as shown in FIG. 13, reduced window 16 is enlarged to a semi-maximized size in the entire area of second semi-maximization region 25a, which is defined as the region corresponding to right upper button 18RU.

If the user presses left lower button 18LD, reduced window 16 is enlarged to a semi-maximized size in the entire area of third semi-maximization region 24b, which is defined as the region corresponding to left lower button 18LD.

Although not illustrated, if the user presses right lower button 18RD, reduced window 16 is enlarged to a semi-maximized size in the entire area of fourth semi-maximization region 25b, which is defined as the region corresponding to right lower button 18RD. Similarly, if the user presses left upper button 18LU, reduced window 16 is enlarged to a semi-maximized size in the entire area of first semi-maximization region 24a, which is defined as the region corresponding to left upper button 18LU.

Figure 14:
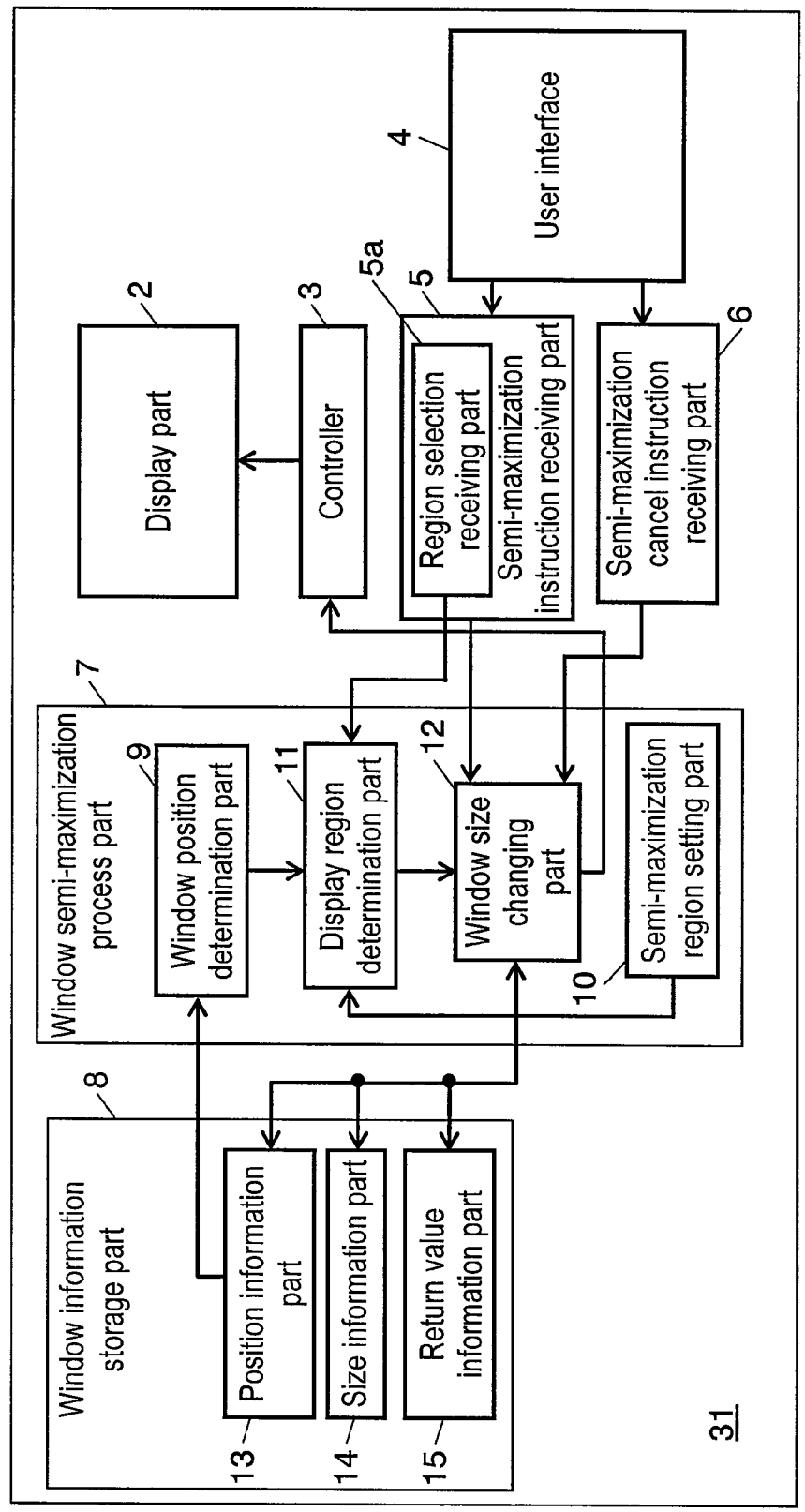
FIG. 14 is a block diagram of an information device according to the fourth embodiment of the present invention.

FIG. 14 is a block diagram of information device 31 according to the fourth embodiment. Information device 31 of FIG. 14 differs from information device 1 of FIG. 1 in that semi-maximization instruction receiving part 5 includes region selection receiving part 5a. The structures and operations of the components other than region selection receiving part 5a are identical to those of the components of FIG. 1. Like components are labeled with like reference numerals with respect to FIG. 1 and hence the description thereof will be omitted.

As shown in FIG. 14, region selection receiving part 5a receives instructions for selecting the display region in which a window is semi-maximized, of the instructions that user interface 4 has received from the user. The instructions received by region selection receiving part 5a are transmitted to display region determination part 11. Display region determination part 11 determines the display region in which a window is semi-maximized, based on the instructions received from region selection receiving part 5a. The instructions received by region selection receiving part 5a are stored therein until new instructions are received.

Thus, in the present embodiment, the user can arbitrarily select the display region in which a window is semi-maximized, thus further improving operability of information device 31.

Figure 15A:
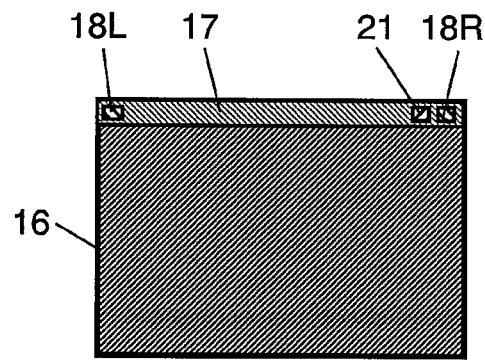
FIG. 15A shows another reduced-window display configuration in the information device.
Figure 15B:
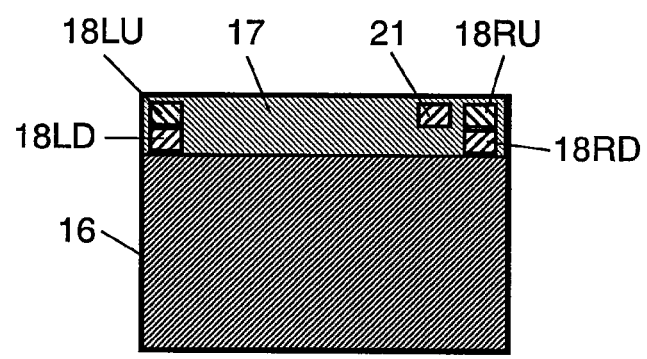
FIG. 15B shows another reduced-window display configuration in the information device.
Figure 15C:
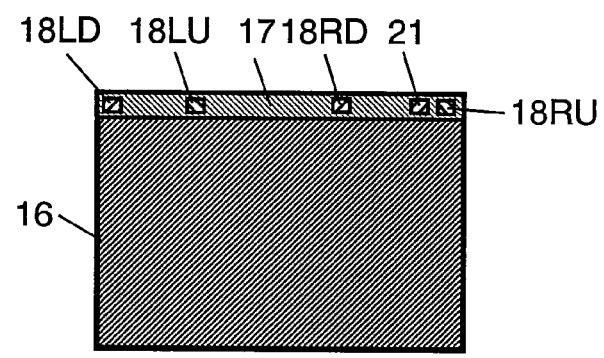
FIG. 15C shows another reduced-window display configuration in the information device.

FIGS. 15A, 15B, and 15C show other reduced-window display configurations in the information device according to the fourth embodiment. In FIGS. 15A, 15B, and 15C, only reduced window 16 is illustrated. In FIGS. 12 and 13, the buttons are arranged in contact with each other; however, the present invention is not limited to this arrangement.

For example, when the screen of the display part is divided into two regions, right button 18R and left button 18L may be arranged apart from each other as shown in FIG. 15A. When the screen is divided into four regions, right upper button 18RU and right lower button 18RD in contact with each other may be arranged apart from left upper button 18LU and left lower button 18LD in contact with each other as shown in FIG. 15B. Alternatively, as shown in FIG. 15C, all of right upper button 18RU, right lower button 18RD, left upper button 18LU, and left lower button 18LD may be arranged apart from each other.

When the number and configuration of semi-maximization regions are different from those in the above-described embodiments, the number and position of semi-maximize button 18 for selecting a display region may correspond to the number of divided regions and their configuration.

In the present embodiment, the display region in which a window is semi-maximized is selected by the user pressing the buttons shown in the upper part of the window. Alternatively, it is possible to assign a function key or the like on a keyboard provided as user interface 4 to execute instructions corresponding to these buttons.

Fifth Embodiment

In the first embodiment, a description of the relation between the application running in a window and the display region in which the window is semi-maximized is omitted. In the fifth embodiment, on the other hand, it is described how the display region in which a reduced window is semi-maximized is determined in association with the application. As a result, the display region in which to semi-maximize reduced window 16 in which a specific application is running can be determined in preference to the determination based on the display position of reduced window 16 as shown in the first embodiment. This further improves visibility and operability of information device.

Figure 16:
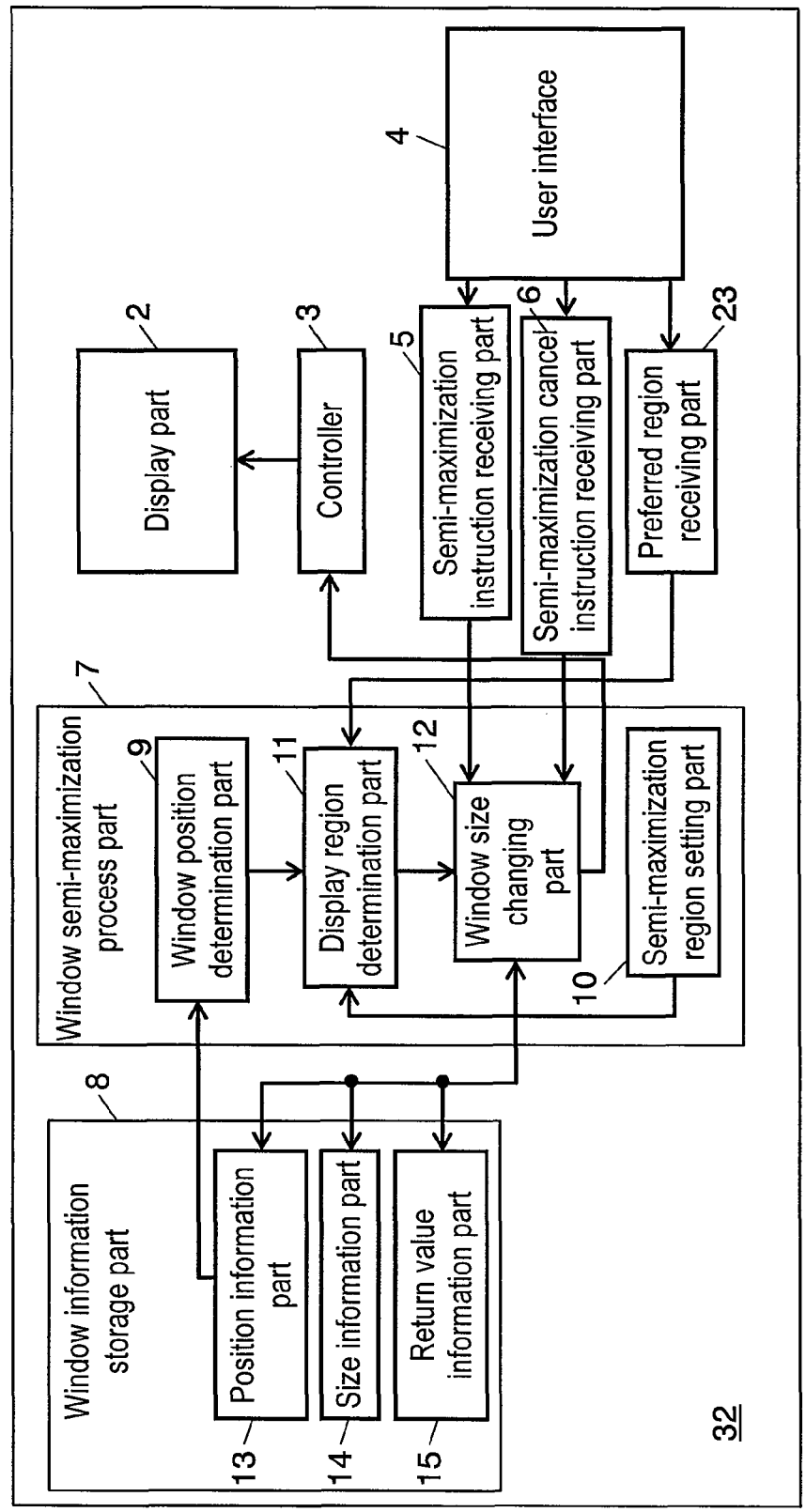
FIG. 16 is a block diagram of an information device according to a fifth embodiment of the present invention.

FIG. 16 is a block diagram of information device 32 according to the fifth embodiment. Information device 32 of FIG. 16 differs from information device 1 of FIG. 1 in having preferred region receiving part 23. The structures and operations of the components other than preferred region receiving part 23 are identical to those of the components of FIG. 1. Like components are labeled with like reference numerals with respect to FIG. 1 and hence the description thereof will be omitted.

As shown in FIG. 16, preferred region receiving part 23 receives instructions on a predetermined association between the application running in a window and the display region in which a window is semi-maximized, of the instructions that user interface 4 has received from the user. Preferred region receiving part 23 transmits the received instructions to display region determination part 11. Display region determination part 11 determines the display region in which a window is semi-maximized, based on the information received from preferred region receiving part 23 and the information on the application running in the window (the route of the application information is not illustrated). The instructions received by preferred region receiving part 23 are stored therein until new instructions are received.

FIGS. 17A and 17B are schematic diagrams showing examples of semi-maximizing reduced windows 16a and 16b, respectively, in association with an application in information device 32 according to the fifth embodiment. In the present embodiment, the screen of display part 2 is divided into two regions shown in FIGS. 17A and 17B, that is, first and second semi-maximization regions 24 and 25, which correspond to the left and right halves, respectively of the screen.

In the present embodiment, the aforementioned association between the application to run in a window and the display region in which the window is semi-maximized is set as follows. Applications for creating documents are associated with first semi-maximization region 24, and applications for creating drawings are associated with second semi-maximization region 25.

In the present embodiment, if the user presses semi-maximize button 18 of reduced window 16a in which an application for creating documents is running as shown in FIG. 17A, reduced window 16a is semi-maximized in first semi-maximization region 24. As a result, semi-maximized window 19a is displayed. On the other hand, if the user presses semi-maximize button 18 of reduced window 16b in which an application for creating drawings is running as shown in FIG. 17B, reduced window 16b is semi-maximized in second semi-maximization region 25. As a result, semi-maximized window 19a is displayed. Thus, in the present embodiment, the display region in which a window is semi-maximized is determined by the aforementioned association received by preferred region receiving part 23.

In the present embodiment, when semi-maximizing reduced windows 16a and 16b, the characters and figures included in these windows are enlarged analogously; however the present invention is not limited to this structure. For example, it is possible to enlarge the display region only, while maintaining the shape and size of the characters and figures to be the same as those shown in reduced windows 16a and 16b. It is also possible to control the aspect ratio of the characters and/or figures included in reduced window 16a or 16b according to an enlargement ratio or a reduction ratio at which they are displayed in semi-maximized window 19a or 19b. It is also possible to change the display region in a window according to the application controlling the window. This further improves visibility and operability of information device 32.

Thus, in the present embodiment, the user can create an arbitrary association. For example, a reduced window in which a frequently-used specific application is running can be semi-maximized in a specified region regardless of its display position. This further improves visibility and operability of information device 32.

When the application running in reduced window 16 is not associated with the display region in which reduced window 16 is semi-maximized, reduced window 16 can be semi-maximized in the display region that is determined based on the display position of reduced window 16a s shown in the first embodiment.

The present embodiment shows the case where one reduced window 16a or 16b is semi-maximized as shown in FIGS. 17A and 17B; however, the present invention is not limited to the semi-maximization of one window. FIG. 18 is a schematic diagram showing an example of semi-maximizing a plurality of independent reduced windows controlled by different applications, the different applications being in association with semi-maximization regions in the information device according to the present embodiment.

In FIG. 18, reduced windows 16a and 16b are displayed as separate reduced windows controlled by two applications; one of reduced windows 16a and 16b is semi-maximized first and then the other is semi-maximized. In this example, the semi-maximization performed in association with an application is in preference to the semi-maximization performed based on the position.

More specifically, as shown in the upper drawing of FIG. 18, reduced windows 16a and 16b are displayed, in which different applications are running. An application for creating documents is running in reduced window 16a, and an application for creating drawings is running in reduced window 16b.

Under such display conditions, if the user presses semi-maximize button 18 of reduced window 16a in which an application for creating documents is running, reduced window 16a is semi-maximized in first semi-maximization region 24 as shown in the bottom left drawing of FIG. 18. As a result, semi-maximized window 39 is displayed.

If, on the other hand, the user presses semi-maximize button 18 of reduced window 16b in which an application for creating drawings is running, as shown in the bottom right drawing of FIG. 18, reduced window 16b is semi-maximized in second semi-maximization region 25. As a result, semi-maximized window 19 is displayed.

The display region in which a window is semi-maximized is determined based on the aforementioned association received by preferred region receiving part 23. Reduced window 16a controlled by an application for creating documents is displayed as semi-maximized window 39 on the left half of the screen of display part 2, and reduced window 16b controlled by an application for creating drawings is displayed as semi-maximized window 19 on the right half of the screen. This allows the user to create or edit documents on semi-maximized window 39 while referring to the drawings on semi-maximized window 19, or to create or edit drawings on semi-maximized window 19 in accordance with the documents on semi-maximized window 39. This further improves visibility and operability of information device 32 in which a plurality of applications are running.

As described in the present embodiment, it is common for users to create or edit documents displayed on the left, while referring to drawings displayed on the right. Alternatively, however, the documents and the drawings may be left-right reversed or arranged in upper and lower parts according to the user preference.

In the present embodiment, reduced window 16a controlled by an application for creating documents is semi-maximized first, and then reduced window 16b controlled by an application for creating drawings is semi-maximized. Alternatively, when semi-maximize button 18 of reduced window 16b is seen behind reduced window 16a as shown in the upper drawing of FIG. 18, the user can press semi-maximize button 18 of reduced window 16b so as to display semi-maximized window 19 on the right half of the screen of display part 2 before semi-maximizing reduced window 16a.

In the bottom left drawing of FIG. 18, reduced window 16a is semi-maximized to become semi-maximized window 39 shown on the screen of display part 2. In the case where both reduced windows 16a and 16b are semi-maximized, it is possible to display reduced window 16b over semi-maximized window 39 so as to prevent semi-maximize button 18 of reduced window 16b from being hidden behind semi-maximized window 39. This simplifies the process of semi-maximizing reduced windows 16a and 16b to semi-maximized windows 39 and 19, respectively.

Such changes in display configurations can be made by changing the settings in window semi-maximization process part 7 or window information storage part 8.

Although two reduced windows are displayed in the present embodiment, the present invention can be applied to cases in which three or more reduced windows are displayed.

The window display method of the present invention can be applied not only to information devices, which are described in the embodiments of the present invention, but also to other electronic devices such as information terminals and portable information devices.

What is claimed is:

1. An information device for displaying a window with a singular semi-maximize button on a screen, the information device comprising:
   a processor configured to:
   set a plurality of display regions on the screen of a single display in which the window is capable of being semi-maximized and displayed based on instructions received from a user of the information device, wherein the plurality of display regions are user defined, determine a display region of the plurality of regions, wherein the processor is configured to a) determine the display region in which the window is semi-maximized based on the display position of the window before being semi-maximized, and to b) determine the display position of the window based on center of gravity of the window, wherein the center of gravity of the window is the point representing the center of the window, semi-maximize the window, and display the semi-maximized window in the determined display region in response to the semi-maximize button on the window being activated.

2. The information device of claim 1, wherein
the processor is configured to:
receive instructions on an association between an application running in the window and the display region in which the window is semi-maximized; and
determine the display region in which the window is semi-maximized, by placing priority on the instructions received.

3. The information device of claim 1, wherein,
the processor is configured to:
receive instructions for selecting a display region in which the window is semi-maximized, and
determine the display region in which the window is semi-maximized, based on the instructions received.

4. An information device for displaying a window with a singular semi-maximize button on a screen, the information device comprising:
a processor configured to:
set a plurality of display regions on the screen of a single display in which the window is capable of being semi-maximized and displayed based on instructions received from a user of the information device, wherein the plurality of display regions are user defined,
determine a display region of the plurality of regions, wherein the processor is configured to a) determine the display region in which the window is semi-maximized based on the display position of the window before being semi-maximized, and to b) determine the display position of the window based on center of gravity of the window, wherein the center of gravity of the window is the point representing the center of the window, multi-step semi-maximize the window, including at least
a first semi-maximization in which the window is enlarged in the determined display region and
a second semi-maximization in which the window is enlarged in two adjacent display regions, one of the two adjacent display regions being the determined display region, and
display the enlarged window in the determined display region and the two adjacent display regions in response to the semi-maximize button on the window being activated.

5. The information device of claim 4, wherein the processor is configured to:
receive instructions on an association between an application running in the window and the display region in which the window is semi-maximized; and
determine the display region in which the window is semi-maximized, by placing priority on the instructions received.

6. The information device of claim 4, wherein
the processor is configured to:
receive instructions for selecting a display region in which the window is semi-maximized; and
determine the display region in which the window is semi-maximized, based on the instructions received.

7. The information device of claim 4, wherein the processor is configured to:
Receive instructions on an association between an application running in the window and the display region in which the window is semi-maximized; and determine the display region in which the window is semi-maximized, by placing priority on the instructions received.

* * * * *